United States Patent [19]

Griswold

[11] 3,874,407
[45] Apr. 1, 1975

[54] PULSE WIDTH MODULATION CONTROL FOR VALVES

[76] Inventor: Ray F. Griswold, 10900 Yolanda Ave., Northridge, Calif. 91324

[22] Filed: Jan. 2, 1974

[21] Appl. No.: 430,151

[52] U.S. Cl.............. 137/596.17, 318/599, 91/417, 91/459, 235/150.1, 328/137, 251/129
[51] Int. Cl. ...................... F16k 31/06, F16k 11/10
[58] Field of Search ........... 318/599, 610, 609, 341, 318/345; 235/150.1, 183; 328/137; 340/347 AD; 137/596.17; 91/417, 459

[56] References Cited
UNITED STATES PATENTS
3,419,784  12/1968  Winn .................................. 328/127
3,659,631  5/1972  Rakoske ......................... 137/596.17

*Primary Examiner*—Eugene G. Botz
*Attorney, Agent, or Firm*—Haarris, Kern, Wallen & Tinsley

[57]                ABSTRACT

A control circuit for a fluid controller such as a solenoid driven valve. A pulse output system operating at a fixed or variable frequency, with pulse width varying as a function of error signal. An integrator for integrating the error signal and providing an input to a threshold trigger circuit, and a multivibrator for periodically grounding the integrator output.

14 Claims, 4 Drawing Figures

PULSE WIDTH MODULATION CONTROL FOR VALVES

This invention relates to controllers for fluid powered servo systems and in particular, to a new and improved control circuit for controlling the flow through an orifice by modulating or oscillating the valve movement.

One type of pulse modulation control is shown in U.S. Pat. Nos. 3,430,536; 3,516,331; and 3,521,535. Another form of pulse modulation control operating two solenoid actuated valves is shown in U.S. Pat. No. 3,659,631. These prior art systems utilize a carrier modulated by an error signal and are considered improvements over the earlier on-off type systems.

However there are continuing demands for faster responses and more efficient use of power fluid, and it is an object of the present invention to provide a new and improved control circuit of the pulse width modulation type having improved response times and reduced power fluid consumption, and improved flexibility in the control function.

The control circuit of the present invention provides an integrator for the error signal, and a threshold level circuit providing an output to the solenoid or other output device when the integrator output exceeds the threshold level. No carrier is utilized and there is no input to the threshold circuit in the absence of an error signal. The integrator output is periodically dissipated, as by connection to circuit ground, to provide the pulse type operation. The control circuit of the invention is equally suitable for driving a single output device and for driving a pair of output devices, and both embodiments will be shown.

Other objects, advantages, features and results will more fully appear in the course of the following description. The drawing merely shows and the description merely describes preferred embodiments of the present invention which are given by way of illustration or example.

Figure 2:
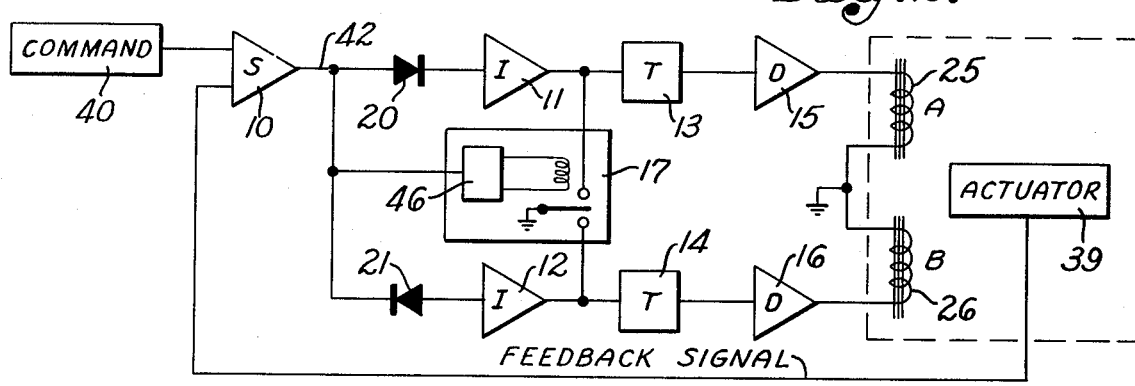
FIG. 2 is an electrical diagram of a control circuit for the servo of FIG. 1 and incorporating the presently preferred embodiment of the invention.

The control circuit of FIG. 2 includes a summing amplifier 10, integrators 11, 12, trigger circuits 13, 14, driver amplifiers 15, 16, and a multivibrator 17. A unidirectional conducting device, typically a solid state diode 20 is connected between the summing amplifier 10 and the integrator 11, and another unidirectional conducting device 21 is connected between the summing amplifier 10 and the integrator 12, with the devices 20, 21 connected with opposite polarity.

Figure 1:
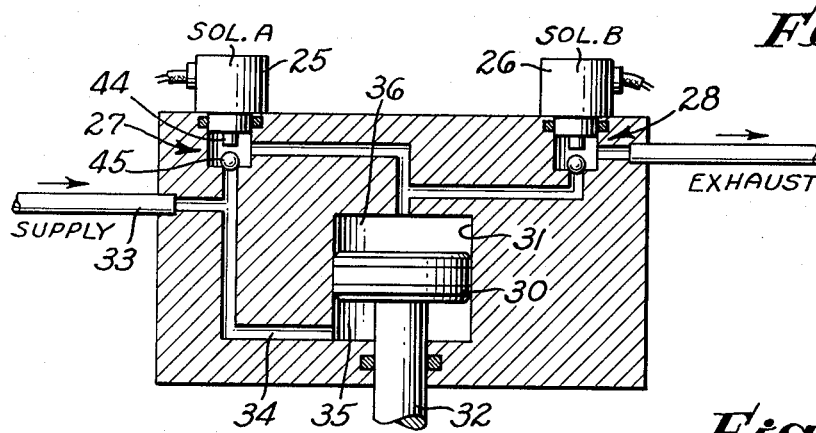
FIG. 1 is a diagram illustrating a typical servo unit controlled by a pair of solenoid actuated valves which may be driven by the control circuit of the invention.

The amplifier 15 may drive a solenoid 25 and the amplifier 16 may drive another solenoid 26, with the solenoids operating valves as shown in FIG. 1. The servo unit of FIG. 1 includes an inlet valve 27 operated by solenoid 25, and exhaust valve 28 operated by solenoid 26. The valves control an actuator, typically a piston 30 moving in a cylinder 31, with the piston driving an output shaft 32. A source of fluid under pressure, typically compressed air, is connected at inlet line 33 and flows through a passage 34 direct to chamber 35 of the cylinder 31, and flows via valve 27 to chamber 36. Valve 28 provides a flow path from the chamber 36 to exhaust. The control circuit is equally suitable for use with other types of actuators, including fluid motors and the like.

The servo unit of FIG. 1 is shown in the dotted enclosure of FIG. 2, with the actuator 39 being the piston and cylinder. A command signal is provided as an input to the summing amplifier 10 from a command signal unit 40. A feedback signal is provided to the summing amplifier 10 from the servo unit or from the device or process controlled by the servo unit. The command signal source, the actuator and the feedback signal source are conventional components and any of the various devices presently available may be utilized.

In operation, the summing amplifier 10 compares the command signal and the feedback signal and generates an error signal on line 42 which is a function of the difference between the command signal and the feedback signal. The command signal is a function of the desired condition of the process being controlled, and the feedback signal is a function of the actual condition. The error signal from the summing amplifier 10 is connected to the integrator 11 through the diode 20 and is integrated with respect to time. Periodically the output of the integrator is dissipated, as by connecting the output to circuit ground through the multivibrator 17. The multivibrator may be a conventional electromechanical single pull double throw switch or a solid state switching circuit providing the same performance.

After the integrator output is disconnected from circuit ground, integration of the error signal begins again from zero. The trigger circuit 13 has a threshold level and generates an output, typically a square pulse, when the integrated output of the integrator exceeds the threshold or trigger level of the trigger circuit. The width of the output pulse of the trigger circuit is controlled by the time interval which begins when the trigger level is exceeded and ends when the multivibrator grounds the integrator output. The slope of the integrator output signal is proportional to the error signal and therefore the width of the pulses will also be proportional to the error signal.

Figure 3:
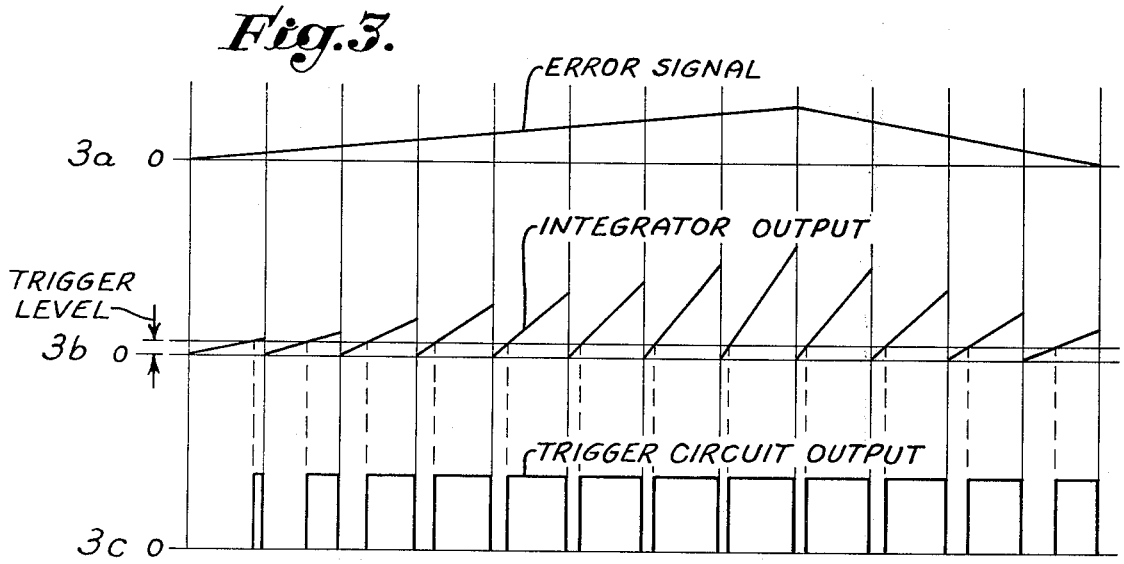
FIG. 3 is a diagram illustrating the operation of the control circuit of FIG. 2.

The output of the trigger circuit 13 is amplified in the driver amplifier 15 and used to energize the solenoid 25. In the embodiment illustrated, when the solenoid is energized, the plunger 44 is pulled upward, permitting the ball 45 to move upward allowing fluid flow through the valve. The valve 28 is operated in a similar manner by a diode 21, integrator 12, trigger circuit 14 and drive amplifier 16. The diode 20 provides for actuating the solenoid 25 with positive error signals and the diode 21 provides for actuating the solenoid 26 with negative error signals. The operation of the system is easily adjusted by varying the integration rate of the integrators, the threshold level of the trigger circuits, and/or the period of the multivibrator. Different characteristics for positive and negative error signals can be obtained if desired by utilizing different settings for the corresponding components in the two signal paths. Operation of the system with a positive error signal is illustrated in FIG. 3, with time plotted on the horizontal axis and signal strength on the vertical axis. The error signal is shown in 3a, the output of the integrator is shown in 3b, and the output of the trigger circuit is shown in 3c, with the trigger circuit being actuated to provide an output when the integrator output crosses the threshold or trigger level as shown in 3b.

In the preferred embodiment, the multivibrator 17 is operated at a fixed frequency, typically in the range of 10 to 200 hertz. However a more complex control system can be achieved by utilizing the error signal from line 42 or some other control signal to modify the frequency at which the multivibrator operates in grounding the integrator outputs, and a variable frequency drive unit 46 having the error signal as an input is illustrated in FIG. 2. The performance of the control circuit around the null or zero signal condition may be improved by operating the multivibrator at a lower frequency for low error signal levels.

Figure 4:
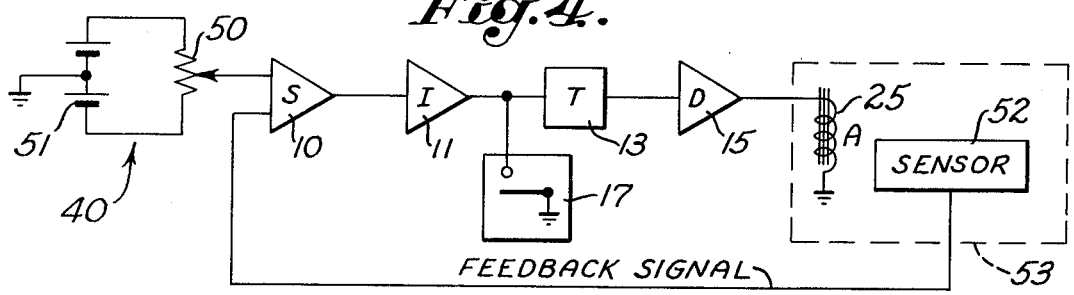
FIG. 4 is a diagram similar to that of FIG. 2 showing a single channel embodiment of the invention.

An alternative embodiment of the invention with a single path control circuit is illustrated in FIG. 4, with components corresponding to those of the embodiment of FIG. 1 and 2 having the same reference numerals. One particular form of command signal unit is illustrated, comprising a potentiometer 50 connected across a voltage source 51, with the mid-point of the voltage source connected to circuit ground. The command signal is provided by the moving arm of the potentiometer 50. The solenoid 25 provides the output for actuating the servo unit indicated by the dash line 53, and the feedback signal is provided from a sensor 52 which senses the condition of the system being controlled and provides the signal to the summing amplifier 10 as a function of the condition. The control circuit of FIG. 4 operates in the same manner as the control circuit of FIG. 2.

In some applications, it may be advantageous to include some proportional output in the integrator, and this is readily achieved by placing a high resistance resistor in parallel with the feedback capacitor in the integrator. The integrator output will then have a steeper initial rise providing a faster response to an error signal.

I claim:

1. A control circuit for a fluid controller, including in combination:

first means for generating an error signal;

first and second signal paths, each of said paths including an integrator, a threshold circuit and an output device;

second means for connecting said error signal as an input to each of said integrators, with an integrator output connected to the corresponding threshold circuit which in turn provides an output signal to the output device when the integrator output exceeds the threshold level of the threshold circuit; and third means for periodically dissipating the integrator outputs.

2. A control circuit as defined in claim 1 wherein said first means includes a source of a command signal, a source of a feedback signal, and a summing unit having said command and feedback signals as inputs.

3. A control circuit as defined in claim 1 wherein said second means includes first and second unidirectional conducting elements, with said first element in said first path and said second element in said second path with a polarity opposite that of said first element.

4. A control circuit as defined in claim 1 wherein said third means includes a switching circuit for periodically connecting the integrator outputs to circuit ground.

5. A control circuit as defined in claim 1 wherein said third means includes a multivibrator unit sequentially connecting the outputs of the first and second integrators to circuit ground.

6. A control circuit as defined in claim 1 wherein each of said output devices includes a solenoid operated valve for control of fluid flow.

7. A control circuit as defined in claim 6 wherein a valve is opened during the period between the time an integrator output exceeds the threshold level and the time the integrator output is dissipated.

8. A control circuit as defined in claim 6 wherein said first means includes a summing unit for receiving a command signal and a feedback signal as inputs, said second means includes first and second unidirectional conducting elements, with the first element in said first path and said second element in said second path with a polarity opposite that of said first element, and said third means includes a switching unit for periodically connecting the integrator outputs to circuit ground.

9. A control circuit as defined in claim 1 wherein said third means includes means for controlling the duration of the periods.

10. A control circuit for a fluid controller including in combination:

first means for generating an error signal;

means defining a signal path including an integrator, a threshold circuit and an output device;

second means for connecting said error signal as an input to said integrator, with the integrator output connected to the threshold circuit which in turn provides an output signal to the output device when the integrator output exceeds the threshold level of the threshold circuit; and third means for periodically dissipating the integrator output.

11. A control circuit as defined in claim 10 wherein said first means includes a summing unit for receiving a command signal and a feedback signal as inputs.

12. A control circuit as defined in claim 11 wherein said third means includes a switching circuit for periodically connecting the integrator output to circuit ground.

13. A control circuit as defined in claim 12 wherein said output device includes a solenoid operated valve for control of fluid flow.

14. A control circuit as defined in claim 10 wherein said third means includes means for controlling the duration of the periods.

* * * * *